J. M. LUNSFORD.
Vehicle Axle.
No. 87,055.
Patented Feb. 16, 1869.
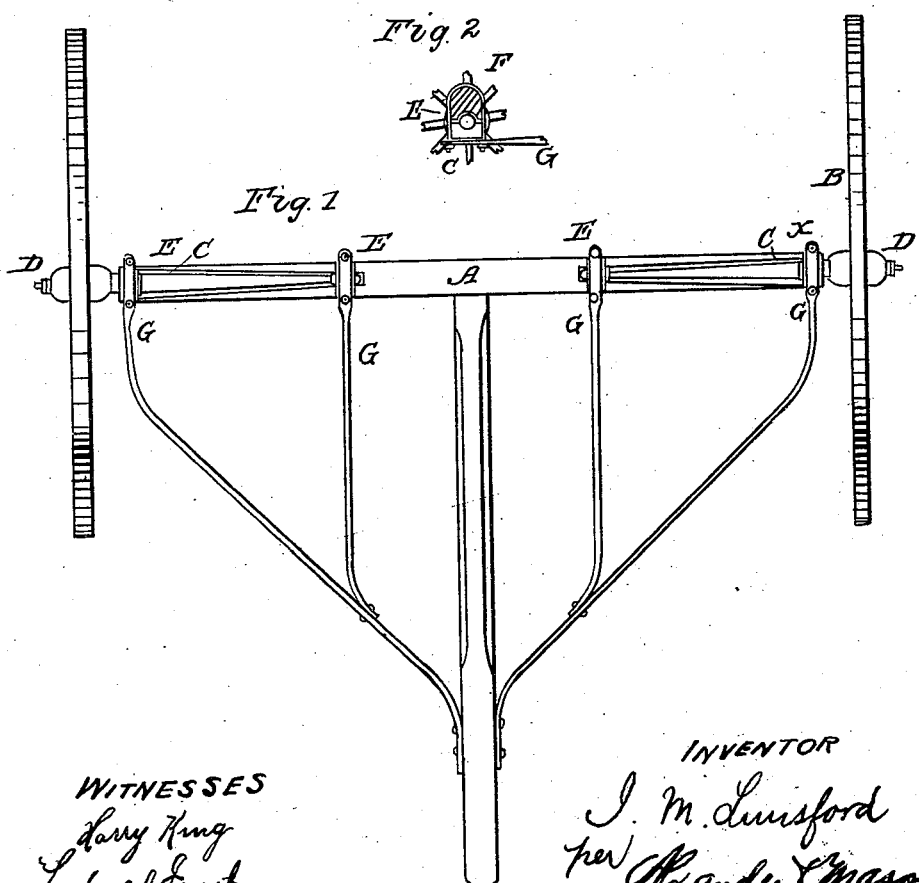
WITNESSES
Larry King
Leopold Evert
INVENTOR
J. M. Lunsford
per Alexander & Mason
Attys

J. M. LUNSFORD, OF FORTVILLE, INDIANA.

Letters Patent No. 87,055, dated February 16, 1869.

IMPROVEMENT IN VEHICLES.

The Schedule referred to in these Letters Patent and making part of the same.

*To all whom it may concern:*

Be it known that I, J. M. LUNSFORD, of Fortville, in the county of Hancock, and in the State of Indiana, have invented a certain new and useful Improvement in Vehicles; and do hereby declare that the following is a full, clear, and exact description thereof, reference being had to the accompanying drawings, and to the letters of reference marked thereon.

The nature of my invention consists in securing the hub of a carriage-wheel to a spindle, which revolves with the wheel in boxes placed on the main axle, combining cheapness, strength, durability, and ease.

In order to enable others skilled in the art to which my invention appertains, to make and use the same, I will now proceed to describe its construction and operation, referring to the annexed drawings, which form a part of this specification, and in which—

Figure 1 is a bottom view, and

Figure 2, a cross-section.

A represents the main axle or skeleton of a vehicle, which may be made of any suitable material, and of any shape.

At the ends of the main axle, the wheels B B are placed, said wheels being secured firmly to the spindles C C.

These spindles are turned in a lathe throughout, being made strongest at the place where they are attached to the ends of the main axle, and each spindle running to a point at the ends, in proportion to the length of the same.

The spindles are reversed in the hubs of the wheels, and made solid therein. A strong screw-nut, D, being placed on the outer ends of the spindles, secures the hub firmly on the same.

The spindles C C extend inward, along the under side of the main axle, to which they are attached by means of boxes E E.

The under side of the axle is grooved to correspond with the tapering form of the spindles, and the upper part of the boxes E E, which boxes are each made in two parts, is bent concave, to correspond with said groove.

The lower part of the boxes is grooved to form a rest or bearing for the spindle.

The boxes E E are placed, one at the end of the main axle, and the other near the inner end of the spindle, the spindle being turned with flanges, or collars, at suitable points, to hold it in its proper place in said boxes.

The lower parts of the boxes E E are grooved on their sides to admit a clasp, F, which is put around the main axle A, from the upper side, the said clasp passing down on each side thereof, and its ends extending below the box, where they pass through holes in a brace, G. Nuts are then put on the ends of the clasp, which thus holds the box firmly in position.

It will be seen that, by this means, the boxes can easily be tightened at pleasure, and as the lower parts of the boxes may be provided with oil-cups, no oil need be wasted, the spindle revolving in the boxes, while, in the old style, the boxes revolve around the spindle.

The advantages of this arrangement are obvious.

It is cheaper than any other, because there is not so much metal; stronger, because the same amount of material is placed in a more advantageous manner to insure strength. It will run without noise, and can be adjusted and oiled without the trouble of taking off the wheels.

Having thus fully described my invention,

What I claim as new, and desire to secure by Letters Patent, is—

The clasps F F, and braces G G, in combination with the wheel B and the spindle C, all constructed and operating substantially as and for the purposes herein set forth.

In testimony that I claim the foregoing, I have hereunto set my hand, this 15th day of August, 1868.

J. M. LUNSFORD.

Witnesses:
  JOHN FAUSSETT,
  J. S. EDWARDS.